United States Patent [19]

Mencacci

[11] 4,375,185
[45] Mar. 1, 1983

[54] MILK STERILIZING APPARATUS

[75] Inventor: Samuel A. Mencacci, San Jose, Calif.

[73] Assignee: FMC Corporation, Chicago, Ill.

[21] Appl. No.: 267,209

[22] Filed: May 26, 1981

[51] Int. Cl.³ .............................................. A23C 3/02
[52] U.S. Cl. ...................................... 99/453; 99/483; 99/516; 239/432; 422/26
[58] Field of Search ................. 99/452, 453, 467, 470, 99/471, 483, 473–476, 516, 534; 426/520–522; 422/26, 307; 210/220; 261/108, 112, 115; 159/4 A; 239/419, 422–424, 427.3, 432, 518

[56] References Cited

U.S. PATENT DOCUMENTS

| | | | |
|---|---|---|---|
| 1,369,345 | 2/1921 | Lobeck | 99/453 |
| 2,049,591 | 8/1936 | Rafn | 99/184 |
| 2,238,373 | 4/1941 | Rogers | 99/251 |
| 2,899,320 | 8/1959 | Davies et al. | 99/216 |
| 3,032,423 | 5/1962 | Evans | 99/215 |
| 3,050,262 | 8/1962 | Curtis | 239/432 |
| 3,212,559 | 10/1965 | Williamson | 159/4 |
| 3,737,106 | 6/1973 | Arnold et al. | 239/518 |
| 3,770,208 | 11/1973 | Mueller | 239/432 |
| 3,771,454 | 11/1973 | Davies | 99/454 |
| 3,847,714 | 11/1974 | Davies et al. | 159/4 A |
| 3,875,318 | 4/1975 | Davies | 426/397 |
| 3,973,048 | 8/1976 | Sollerud | 426/522 |
| 4,072,270 | 2/1978 | Harmony | 239/432 |
| 4,162,971 | 7/1979 | Zlokarnik et al. | 210/15 |

FOREIGN PATENT DOCUMENTS 538399  7/1955  Belgium .............................. 99/453

OTHER PUBLICATIONS

National Institute for Research in Dairying, England; an Article Entitled an Introduction to the Ultra-High--Temperature Processing of Milk and Milk Products by H. Burton.

Primary Examiner—Philip R. Coe
Assistant Examiner—Timothy F. Simone
Attorney, Agent, or Firm—A. J. Moore; H. M. Stanley; R. B. Megley

[57] ABSTRACT

This invention concerns the heating of a liquid, such as milk, by steam infusion and involves the formation of the liquid into a descending curtain that is initially generally frusto-conical in configuration and later is generally cylindrical as it passes through an atmosphere of steam. The curtain is of relatively small diameter at its upper end and continually increases its diameter as it moves downwardly, thus, not only causing the thickness of the film to progressively decrease but also causing the surface area of the film to be greatly enlarged.

11 Claims, 4 Drawing Figures

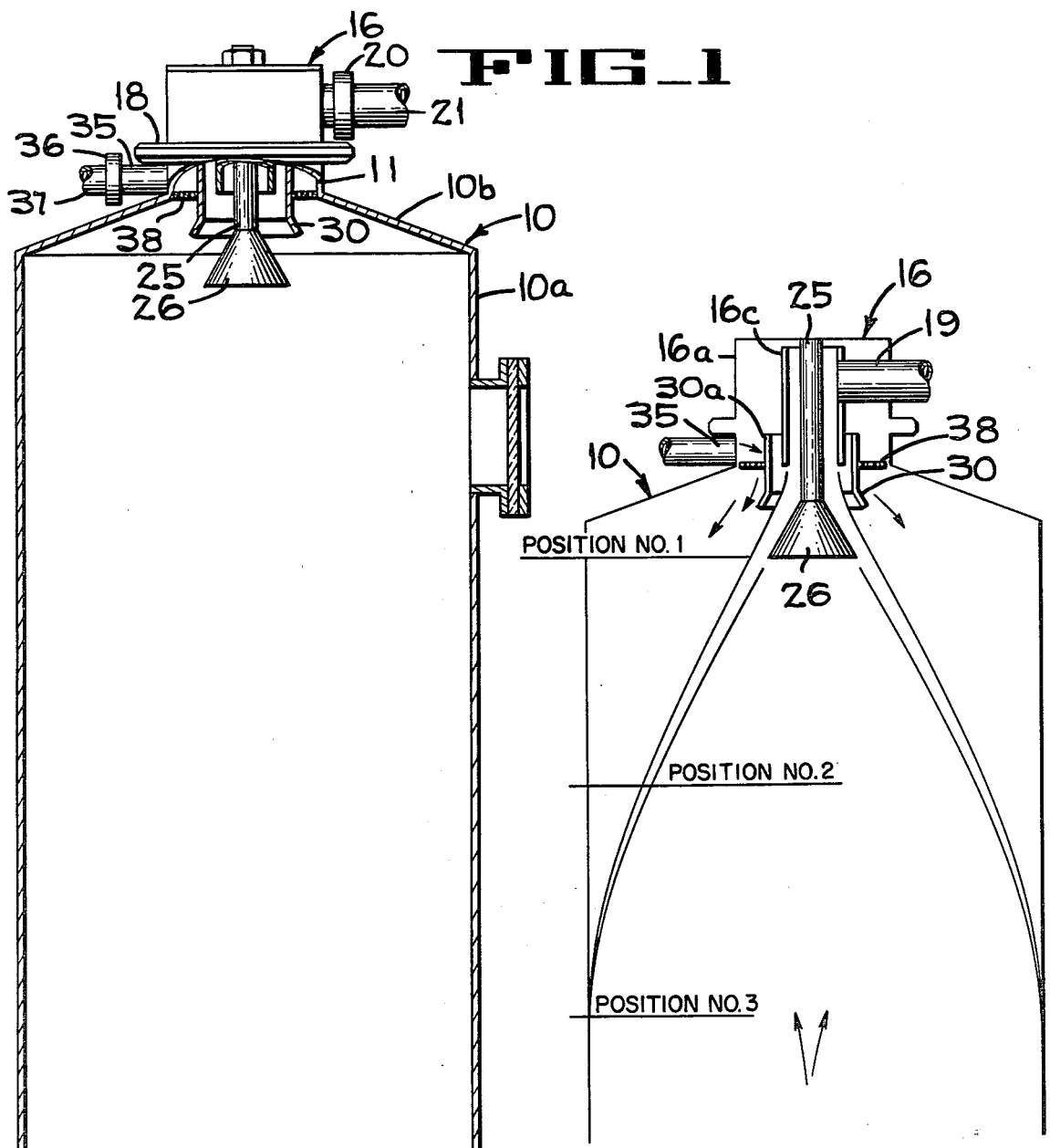

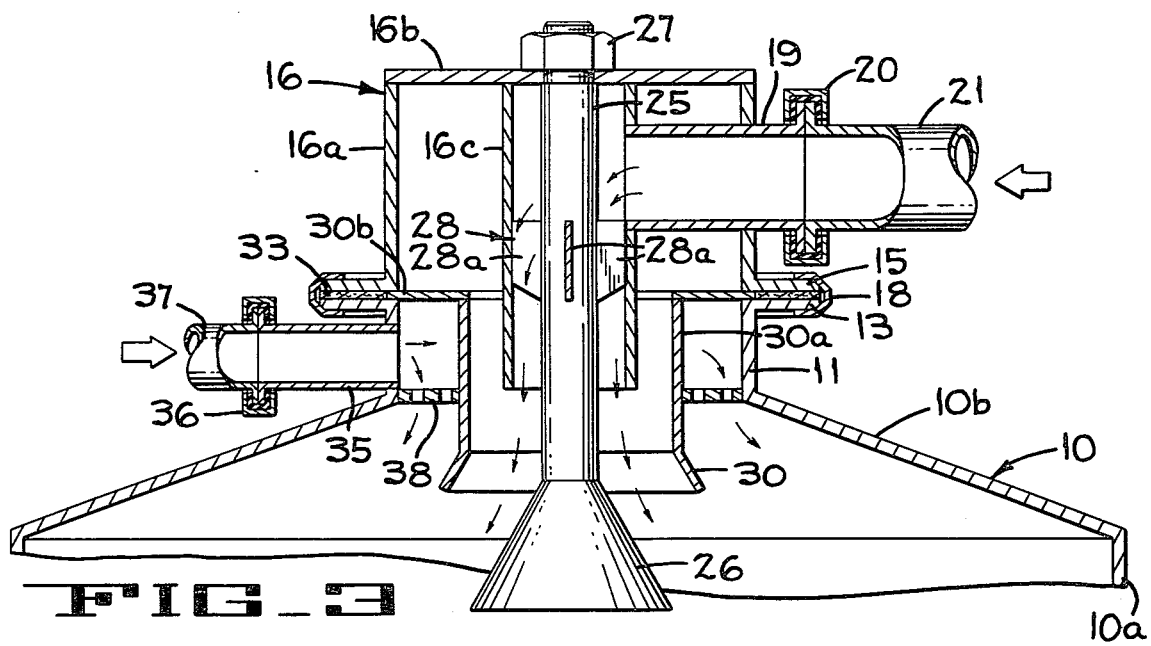
FIG_3
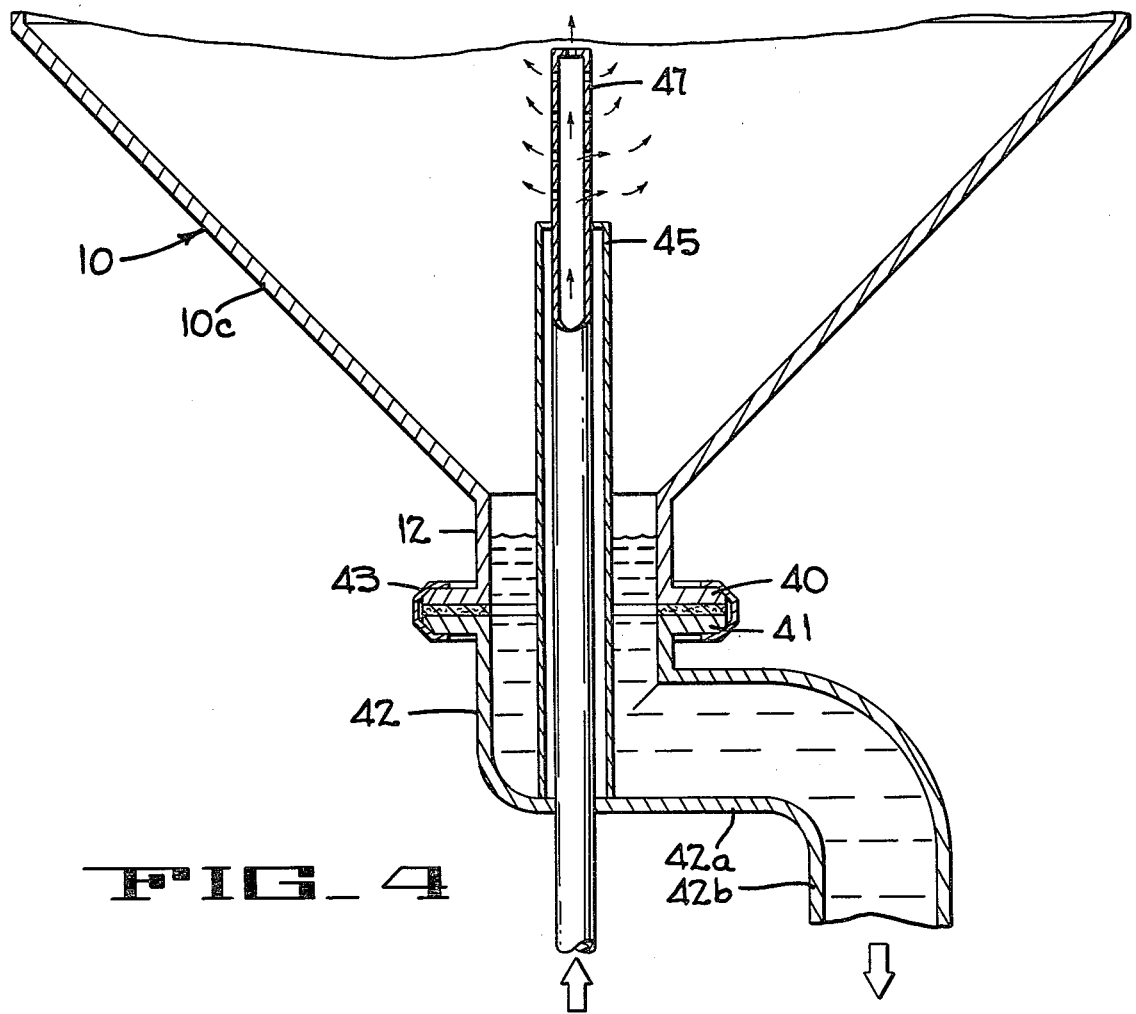
FIG_4

MILK STERILIZING APPARATUS

BACKGROUND OF THE INVENTION

The process of subjecting material in liquid form to a heat treatment has been carried out in various fields where liquid products are being prepared for use, and various methods and apparatus have been developed for attaining the desired degree of heating. In common with the equipment of the present invention, some apparatus involves directing the liquid through a heated chamber in film form to heat it. The patent to Evans U.S. Pat. No. 3,032,423 discloses apparatus for directing liquid in planar sheet-like form downwardly from inlet tubes through the interior of a heated vessel. Similarly, the patent to Davies U.S. Pat. No. 3,771,434 discloses apparatus for directing sheet-like films of liquid through a heat-treatment chamber. The patent to Davies U.S. Pat. No. 3,847,714 teaches the use of a plurality of nozzles spaced in a circular path and arranged to direct liquid downwardly to form a descending curtain of liquid. Zlokarnik et al U.S. Pat. No. 4,162,971 discloses a generally conical deflector that is disposed in the flow path of incoming liquid and is arranged to deflect the liquid outwardly and distribute it across the full cross-section of a mixing chamber. None of these patents teach or suggest the concept of forming the liquid into a descending, continuous curtain wherein the diameter of the curtain continually increases as the film moves downwardly and outwardly, and the thickness of the film decreases progressively.

An object of the invention is therefore to provide a method and apparatus for heat treating material in liquid form in such a way that the surface area of the film increases rapidly, thus exposing new surfaces to the heating medium, while the thickness of the film decreases in thickness to cause an increase in the rate of heat absorption by the liquid thereby providing a relatively short time-temperature ratio.

Another object is to provide apparatus in which a liquid, such as milk, can be raised to a sterilizing temperature in an atmosphere of steam before the milk contacts a surface that is much hotter than itself, thus preventing burning-on or off-flavor of the milk.

SUMMARY OF THE INVENTION

An apparatus is disclosed for providing an atmosphere of high temperature steam, and then directing a liquid, such as milk, through the steam atmosphere in the form of a descending film which is initially in a generally frusto-conical configuration as it moves through the steam. The apparatus includes an inlet tube arranged to deliver a column of liquid downwardly onto the upper surface of a frusto-conical deflector near the axis of the deflector which is mounted near the upper end of a vessel adapted to contain high temperature steam. The liquid is caused to flow downwardly and outwardly along the downwardly and outwardly sloping walls of the deflector in a generally frusto-conical pattern toward the cylindrical inner wall of the vessel.

DESCRIPTION OF THE DRAWINGS

FIG. 1 is a diagrammatic side elevation of the apparatus of the present invention, with parts broken away and parts in section to disclose the parts of the apparatus that are located inside the generally cylindrical vessel in which the milk is treated.

FIG. 2 is a fragmentary, schematic, illustration of the dispersion of the milk as it contacts the upper end of the frusto-conical deflector and moves outwardly and downwardly in the vessel.

FIG. 3 is an enlarged vertical section taken centrally through a portion of the upper end of the apparatus of FIG. 1.

FIG. 4 is an enlarged vertical section taken centrally through a portion of the lower end of the apparatus of FIG. 1.

DESCRIPTION OF A PREFERRED EMBODIMENT

In FIG. 1 the reference numeral 10 indicates a tank having a cylindrical body portion 10a, an upper frusto-conical dome 10b and a lower frusto-conical dome 10c. Short cylindrical members 11 and 12 are integrally formed with or welded to the upper and lower domes 10a and 10b, respectively, (FIG. 3). The upper cylindrical member has a flange 13 formed on its upper end which mates with a flange 15 of an inlet housing 16 that has a cylindrical outer wall 16a, a circular top plate 16b, and a cylindrical inner wall 16c that extends downwardly from the top plate. The members 16a, 16b and 16c are all welded together to form a unitary structure which is secured to flange 13 by a quick-disconnect clamp 18 that locks the flange 15 to the flange 13. A tube 19 is secured in aligned openings in the inner and outer walls of the inlet housing 16 and projects outwardly a short distance from the outer wall to receive a quick-disconnect gasketed clamp 20 that secures a flange on tube 19 to a flange on tube 21 leading to a supply of milk.

A rod 25 extends downwardly from the center of the top plate 16b and carries, at its lower end, a frusto-conical dispersal cone 26. The upper end of the rod 25 is threaded and extends through a hole in the top plate 16b to receive a nut 27. Radially extending plates 28a of a support spider 28 center and support the rod 25 within the inner wall 16c of the housing 16. A frusto-conical deflector 30 is supported in spaced relation outwardly from the rod 25 by a cylindrical upper extension 30a that is welded on the underside of an annular plate 30b which has an outer annular portion locked between the flanges 13 and 15 just inwardly of an annular gasket 33 that is also locked between the flanges 13 and 15.

A steam inlet member 35, which is connected by collar 36 to a conduit 37 leading to a source of steam, is welded in an opening in the cylindrical upper member 11 of the tank. Steam entering the housing is directed downwardly through a perforated annular steam distribution plate 38 which is welded to the upper extension 30a of the deflector 30 and is slidable relative to the wall of the vessel.

At the lower end of the tank 10, the cylindrical member 12 is provided with a flange 40. A flange 41 of a discharge housing 42 is secured to flange 40 by a quick-disconnect clamp 43. The housing 42 has two right angle sections 42a and 42b, with section 42b leading to a suitable receptacle for the heated liquid. A cylindrical heat shield 45 is welded to the inner lower wall of housing 42 and projects upwardly therefrom. A steam inlet pipe 47, which is welded to the housing 42 and extends upwardly through an opening in the lower wall of the housing, is positioned centrally in the heat shield 45. The upper end of the steam inlet pipe projects above the upper end of the heat shield and has a plurality of discharge openings therein.

All of the above-mentioned apparatus with the exception of the delivery conduit 21, the steam delivery conduit 37, and the deflector 26 are preferably constructed of stainless steel. The conduits 21 and 37 may be of any material suitable for carrying the fluid that is directed through them, and the deflector 26 is preferably made of a plastic that has relatively low thermal conductivity properties so that, in spite of the fact that it is disposed in an atmosphere of steam, it will not reach a temperature that will cause scorching of a heat-sensitive liquid, such as milk, as the liquid comes in contact with and flows over the surface of the deflector. The deflector shield 30 surrounding the incoming liquid should be large enough so that the liquid does not contact it, and it should be inclined sufficiently to insure that the steam is directed radially outwardly in the vessel to areas that are clear of the path of the liquid flowing along the inclined surfaces of the deflector 26. The rate of movement of liquid through the vessel 10 should be such that the liquid accumulates in the lower end of the vessel approximately to the level shown in FIG. 4. It may accumulate to a slightly higher level, as in the lower portion of the section 10c of the vessel 10 but in no instance should it reach a level that is above the upper end of the cylindrical heat shield 45.

In accordance with the present invention this apparatus is particularly well adapted for sterilizing milk. This is so because the current process for sterilizing milk aseptically is to heat the milk by exposing it to a direct environment of steam. By use of this type of processing, milk heated to a temperature in the range of around 80° C. to 146° C. for a very short time, something in the neighborhood of 0.25 to 0.33 seconds, results in a much improved flavor generated in the milk with a minimum amount of chemical changes. In the current accepted aseptic methods of sterilizing milk, the milk is first preheated from about 4° C. to 80° C. in either a plate or shell and tube heat exchanger. It is to be noted that at these temperatures the scorching of the milk is not a problem but above 80° C. it is imperative that a procedure involving a direct-contact between the steam and the milk is used, either by steam injection or steam infusion. As is evident from the above-description, this apparatus heats liquid by steam infusion.

In FIG. 2 it will be noted that during the initial portion of the flow of liquid off the lower edge of deflector 26, it follows a generally frusto-conical path. Shortly after leaving the surface of the deflector, the path that the liquid follows varies so that at any instant the location of the center of the film relative to a vertical axis through the deflector cone can be expressed as a point having an x, y coordinate wherein the "x" coordinate is a function of the horizontal component of the velocity of the liquid as it leaves the deflector and the time that has expired since the liquid left the bottom of the deflector, and the "y" coordinate is a function of the vertical components of the velocity of the liquid as it leaves the deflector and the time that has expired since the liquid left the bottom of the deflector and of gravitational acceleration and the square of the time, thus $$"x" = x_0 + v_x t$$

$$"y" = y_0 + v_y t + \tfrac{1}{2} g t^2$$

where

"$x_0$" is the initial x coordinate at the bottom of the deflector

"t" is the time that has elapsed since the liquid left coordinate $x_0$, and

"$y_0$" is the initial y coordinate

"v" is the velocity of liquid flow

"g" is gravitational acceleration

In applying the equations, a rate of flow of liquid is decided upon, such as 20 gpm, and an inlet housing having a discharge nozzle 16c of predetermined area, such as 0.8238 sq. in., is installed in the apparatus. With the flow rate and the discharge area known, the velocity of the liquid leaving the nozzle 16c can be calculated.

Each value of x indicates the distance the film is, at that instant, from the vertical axis of the cone and this distance is, of course, half the mean diameter of the curtain defined by the falling liquid. Since the velocity of the liquid is determined, the diameter of the curtain is determined, and since the flow rate is fixed, the thickness of the film at that diameter can be determined.

Similarly, the area of the inner surface of the film and the area of the outer surface of the film that has been exposed to the steam during its descent to the point in question can be calculated. With the temperature of the steam and the amount of area exposed to the steam determined, the amount of heat transferred to the liquid and the temperature of the liquid can be calculated in the following manner. In sterilizing milk using this apparatus, it was assumed that the heat transfer function of steam to milk is of the form of $$K \times \left( \frac{\text{Area}}{\text{thickness}} \right) \times (\text{time}) = t_1 - t_2$$

where K is coefficient of heat transfer from steam to the milk being heated.

Using this data, the following tables were developed which contain computed data that illustrate the condition of milk at three arbitrary positions, i.e., position No. 1 (FIG. 2) at the level of the lower surface of the deflector 26, position No. 3 at the point where the film starts to break up and assume a generally cylindrical configuration, and position No. 2 which is about half-way between positions No. 1 and 3. The thickness of the film at each position is important since the rate of heat absorption is dependent on the thickness of the film. The temperature of the film at each position is important because the amount of heat treatment necessary is dependent on the desired temperature, and it is to be noted that in the following two charts, the milk reaches a sterilizing temperature at or before position No. 3 is reached. The diameter of the film at position No. 3 is important because the inner diameter of the vessel 10 is dependent on this figure.

TABLE A

| a. Volume of incoming milk | 20 gpm |
|---|---|
| b. Diameter of delivery conduit | 1.05" |
| c. Temperature of income milk | 80° C. |
| d. Angle of cone | 90° |
| e. Diameter at base of cone | 2.5" |
| f. Temperature of steam | 143.5° C. |
| g. Final temperature of milk | 140° C. |

| | Distance From Base Of Cone | Thickness Of Film | Temp. Of Film | Aver. Diam. Of Film | Total Film Area Contacted By Steam |
|---|---|---|---|---|---|
| POS. #1 | 0" | 0.1068" | 176° F. | 2.5" | 0 |
| POS. #2 | 9.0" | 0.0243" | 208° F. | 14.5" | 541 sq. in. |

TABLE A-continued

| POS. #3 | 18.0" | 0.0070" | 284° F. | 24.4" | 1805 sq. in. |
|---|---|---|---|---|---|
| | | time = 0.174 seconds | | | |

TABLE B

| a. Volume of incoming milk | 10 gpm |
|---|---|
| b. Diameter of delivery conduit | 0.62" |
| c. Temperature of income milk | 80° C. |
| d. Angle of cone | 60° |
| e. Diameter at base of cone | 2.5" |
| f. Temperature of steam | 143.5° C. |
| g. Final temperature of milk | 140° C. |

| | Distance From Base Of Cone | Thickness Of Film | Temp. Of Film | Aver. Diam. Of Film | Total Film Area Contacted By Steam |
|---|---|---|---|---|---|
| POS. #1 | 0" | 0.0384" | 176° F. | 2.5" | 0 |
| POS. #2 | 9.0" | 0.0087" | 204° F. | 9.68" | 299 sq. in. |
| POS. #3 | 18.0" | 0.0041" | 284° F. | 17.62" | 1147 sq. in. |
| | | time = 0.119 seconds | | | |

TABLE C

| a. Volume of incoming milk | 10 gpm |
|---|---|
| b. Diameter of delivery conduit | 0.85" |
| c. Temperature of income milk | 80° C. |
| d. Angle of cone | 60° |
| e. Diameter at base of cone | 2.5" |
| f. Temperature of steam | 143.5° C. |
| g. Final temperature of milk | 140° C. |

| | Distance From Base Of Cone | Thickness Of Film | Temp. Of Film | Aver. Diam. Of Film | Total Film Area Contacted By Steam |
|---|---|---|---|---|---|
| POS. #1 | 0" | 0.0712" | 176° F. | 2.5" | 0 |
| POS. #2 | 9.0" | 0.0143" | 207° F. | 8.60" | 270 sq. in. |
| POS. #3 | 18.0" | 0.067" | 284° F. | 14.18" | 951 sq. in. |
| | | time = 0.1722 seconds | | | |

From the above it will be evident that, starting with certain physical data such as the desired flow rate of the milk, the angle and size of the deflector cone, and the diameter of the inlet conduit, and using 143.5° C. steam, the temperature of milk should be raised from 80° C. to 140° C. in a predetermined computed time. Further, the maximum diameter of the milk curtain can be obtained. Accordingly, a milk sterilizer can be built, having the above-mentioned physical data and being constructed in accordance with the present specification and drawings, with the reasonable expectation that the milk will reach 140° C. within the calculated time. Such a sterilizer will have a cylindrical steam chamber that is a few inches larger in diameter than the computed maximum diameter of the milk curtain. When whole milk at 80° C. is passed through the sterilizer at the desired gallons per minute, and the steam temperature is 143.5° C., it will reach the desired temperature and then be discharged from the vessel and directed into a holding section. A recording thermometer, located in the discharge end of the vessel, continuously records the temperature of the milk. For whole milk, laboratory tests have determined that such milk will have reached commercial sterility if its temperature has been raised to 140° C. and that temperature is maintained for from 3 to 4 seconds. In the present apparatus, a conduit connected to the discharge housing 42 constitutes a holding section through which the milk passes. In such a holding station there is very little heat loss and the temperature of the milk will remain substantially the same as it was when it passed the recording thermometer.

If the recording thermometer indicates that the milk is slightly below 140° C. one of several adjustments can be made. First, the temperature of the incoming milk can be increased. Secondly, the velocity of the milk can be reduced by increasing the diameter of the inlet conduit 19 and the area of the annular passage around the rod 25 in the cylindrical conduit 16c. It is to be noted that the quick-disconnect clamps 18 and 20 permit easy replacement of the inlet housing 16. The third adjustment that may be made is the increasing of the temperature of the steam.

In sterilizing milk by steam infusion, it is highly desirable that the differential between the temperature of the steam and the temperature to which the milk is to be raised be as small as possible, and that the temperature of the milk be raised to sterilizing temperature in as short a time as possible. Stated another way, it is well known throughout the food industry that milk processing for shorter times at higher temperatures generally maintains the quality of the milk closer to its original quality than processing for longer intervals at lower temperatures.

Referring to the calculated values shown in TABLES A, B and C, it will be seen that the apparatus of the present invention is particularly well adapted for high temperature-short time sterilizing of milk. TABLE A indicates that milk at 80° C. can be raised to a temperature of 140° C. at the rate of 20 gpm. in 0.174 seconds. TABLE B indicates that the temperature of milk at 80° C. can be raised to 140° C. in 0.119 seconds when processed at a rate of 10 gpm. TABLE C indicates that, with this sterilizer, milk at 80° C. can be raised to a temperature of 140° C. in 0.1722 seconds. The short time processing is accomplished by the unique way the diverter cones spread the liquid outwardly causing it to fall through the steam in a film that progressively decreases in thickness. In the TABLE A example the cone is a 90° cone and the film reaches a maximum diameter of about 24.4 inches. Thus, a cylindrical container having an internal transverse diameter of about 26 or 27 inches can be used. In the TABLE B example, the cone angle is 60° and the maximum diameter of the film is about 17.62 inches. In the TABLE C example, the cone angle is 60° and the maximum film diameter is about 14.18 inches. The flexibility provided by the apparatus in its arrangement for changing either the cone angle or the cross-sectional area of the milk-inlet conduit adapts the equipment for processing milk for a wide range of conditions. If milk processed as outlined above does not meet the above criteria in that the temperature is below 140° C. after three seconds of holding, it is necessary only to raise the temperature of the steam slightly.

Although the best mode contemplated for carrying out the present invention has been herein shown and described, it will be apparent that modification and variation may be made without departing from what is regarded to be the subject matter of the invention.

What is claimed is:

1. Apparatus for heat-treating liquiform material comprising vessel means closed by top, bottom and side wall means which define an internal chamber, means for directing a stream of liquid to be heated into the chamber at the upper end of the vessel, means for forming the stream of liquid into a radially-expanding descending curtain-like film which decreases in thickness as it moves down in said chamber, said curtain-like film including inner and outer surfaces which increase in area during descent, and means for directing steam into said chamber into direct contact with the inner and outer surfaces of said liquid for quickly sterilizing the liquid.

2. The apparatus of claim 1 wherein said vessel is of generally cylindrical configuration and is disposed with its axis oriented generally vertical, and said means for directing a stream of liquid into said chamber includes an entrance passage disposed generally on said axis.

3. The apparatus of claim 1 wherein said means for directing a stream of liquid to be heated into said chamber includes an entrance passage spaced inwardly from all portions of said side wall means.

4. The apparatus of claim 1 wherein said vessel is of generally cylindrical configuration and is disposed with its axis oriented generally vertical, and said means for forming the stream includes a deflector disposed substantially on the axis of said vessel and having an upwardly facing stream-deflecting surface for intercepting and guiding the stream radially outwardly from the axis of said vessel.

5. The apparatus of claim 1 wherein said means for directing a stream of liquid into said vessel includes an inlet housing secured to the top wall of said vessel and having an inlet opening disposed substantially on the axis of said cylindrical vessel, and said deflector includes a member having an annular, upwardly-facing, downwardly and outwardly sloping surface for intercepting the stream of liquid and directing it downwardly and radially-outwardly in said vessel.

6. The apparatus of claim 1 wherein said means for directing steam into said chamber includes steam conduits arranged to deliver steam upwardly within the curtain-like film for directing heat against the inside surface thereof, and downwardly around the outer surface of said curtain-like film for directing heat against the outer surface thereof.

7. The apparatus of claim 6 wherein said conduit for delivering steam upwardly into said chamber is an upwardly-projecting conduit and has discharge openings spaced above the bottom wall of said vessel.

8. The apparatus of claim 7 including a heat shield disposed around said upwardly projecting conduit to isolate said conduit from liquid in the lower portion of said chamber.

9. The apparatus of claim 1 wherein said means for delivering steam into said chamber includes an annular conduit, and said means for directing a stream of liquid into said chamber includes a passage disposed centrally of said angular conduit, said apparatus further including means for intercepting the steam in said annular conduit and directing it downwardly and outwardly relative to the stream entering said chamber through said passage for forming said curtain-like film of liquid.

10. Apparatus for heat-treating liquiform material comprising: means defining a pressure vessel including side walls, a top and a bottom wall and defining a processing chamber therein; means for directing a stream of liquid to be heated into the chamber at the upper end thereof, means for forming the stream of liquid into an outwardly expanding descending curtain-like annular film of liquid which decreases in thickness as it moves downwardly in said chamber and has inner and outer surfaces which increase in area during descent, and means for directing steam at sterilizing temperature into said chamber into direct contact with both the inner and outer surfaces of said liquid for quickly sterilizing the liquid.

11. An apparatus according to claim 10 wherein only one curtain-like film of liquid is formed in said chamber.

* * * * *